(12) United States Patent
Matsukawa

(10) Patent No.: US 10,436,903 B2
(45) Date of Patent: Oct. 8, 2019

(54) LASER RADAR DEVICE

(71) Applicant: DENSO WAVE INCORPORATED, Chita-gun, Aichi-pref. (JP)

(72) Inventor: Shoma Matsukawa, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 250 days.

(21) Appl. No.: 15/611,262

(22) Filed: Jun. 1, 2017

(65) Prior Publication Data

US 2018/0024242 A1    Jan. 25, 2018

(30) Foreign Application Priority Data

Jul. 20, 2016  (JP) ................................ 2016-142031

(51) Int. Cl.
*G01C 3/08*  (2006.01)
*G01S 17/10*  (2006.01)
*G01S 7/481*  (2006.01)
*G01S 7/486*  (2006.01)

(52) U.S. Cl.
CPC ............ *G01S 17/10* (2013.01); *G01S 7/4817* (2013.01); *G01S 7/4868* (2013.01)

(58) Field of Classification Search
CPC ....... G01S 17/10; G01S 7/4817; G01S 7/4868
See application file for complete search history.

(56) References Cited

U.S. PATENT DOCUMENTS

| | | | |
|---|---|---|---|
| 6,862,083 B1* | 3/2005 | McConnell, Sr. ... | A01B 79/005 356/4.01 |
| 7,969,558 B2* | 6/2011 | Hall ..................... | G01S 7/4813 356/5.01 |
| 2003/0133093 A1* | 7/2003 | Asaka .................... | G01S 17/58 356/5.01 |
| 2010/0026984 A1* | 2/2010 | Lewis ................... | G01S 7/4811 356/5.01 |

FOREIGN PATENT DOCUMENTS

JP         2010-203820 A      9/2010

* cited by examiner

*Primary Examiner* — Samantha K Abraham
(74) *Attorney, Agent, or Firm* — Oliff PLC

(57) ABSTRACT

A laser radar device includes a storage unit, a sensing level setting unit, a time measuring unit and a correcting unit. The storage unit stores an emitting direction of an inner reflection-measurement laser light that is a second laser light of three laser lights include a first laser light, the second laser light and a third laser light when a distance between spots defined by the first and the third laser lights at a maximum sensing distance is less than or equal to a size of an external subject. The sensing level setting unit sets a sensing level where an inner reflection light can be sensed when emitting directions of the laser lights are in the emitting direction of the inner reflection-measurement laser light. The time measuring unit measures an inner light-reflection sensing time. The correcting unit corrects the distance calculation formula, based on the inner light-reflection sensing time.

4 Claims, 7 Drawing Sheets

LASER RADAR DEVICE

CROSS REFERENCE TO RELATED APPLICATION

This application is based on Japanese Patent Application No. 2016-142031 filed on Jul. 20, 2016, the disclosure of which is incorporated herein by reference.

TECHNICAL FIELD The present disclosure relates to a laser radar device that calculates a distance from the laser radar device to a subject.

BACKGROUND

A laser radar device measures a distance from the laser radar device to a subject that is located at a position outside of the laser radar device, by using a time interval from a time point that a laser light is emitted to a time point that the laser light is received. When the laser radar device measures the distance from the laser radar device to the subject, it is necessary to consider a delay time that is generated in a calculation operation such as a transmission time of a signal transmitted to a light emitting unit that emits the laser light, or a transmission time of a signal transmitted from the light emitting unit. The delay time dynamically varies when being affected by a temperature characteristic. Thus, the laser radar device measures a variation of the delay time when measuring the distance from the laser radar device to the subject, and corrects a formula used to calculate the distance based on the variation of the delay time.

According to JP2010-203820A, the laser radar device emits the laser light generated by a laser diode in a travelling direction deflected by a rotation mirror. Further, since a window that is a light transmitting plate is not arranged on an entire of a case in a peripheral direction, the laser light may travel in a direction toward the case.

According to JP2010-203820A, when the laser light travels in the direction toward the case, a reflection member that reflects the laser light is provided in the case. In this case, the laser radar device measures a sensing time from a time point that the laser light is emitted to a time point that a reflection light that is the laser light reflected by the reflection member is sensed. Since a length of a light path of the reflection light generated by the reflection member is known, a variation of the sensing time is correlative to the variation of the delay time. Thus, the laser radar device corrects the formula used to calculate the distance based on the sensing time of the reflection light.

SUMMARY

A fluctuating mirror such as a MEMS mirror may be used instead of the rotation mirror disclosed in JP2010-203820A, to scan the laser light emitted by the light emitting unit. When the fluctuating mirror is used, the laser light can be scanned in a vertical direction in addition of a horizontal direction. Further, when the fluctuating mirror is used, all of scanning directions of the laser lights emitted by the light emitting unit can be controlled to be in directions toward the window. Thus, a subject sensing period can be shortened.

However, when all of the scanning directions of the laser lights are in directions toward the window, no traveling direction of the laser light is a direction toward the case. Thus, according to JP2010-203820A, the reflection light cannot be generated in the case. Thus, it is difficult to correct the formula that calculates the distance from the laser radar device to the subject in case where all of the scanning directions of the laser lights are in directions toward the window.

When the laser light passes through the window, a part of the laser light is reflected by the window, and then a reflection light is generated. Thus, when the laser radar device senses an external subject, it is necessary prevent the light receiving unit from being saturated with the reflection light that is generated by a reflection of the window and is sensed by the light receiving unit. When the laser radar device senses the external subject, it is considered that the reflection light generated by the reflection of the window is not sensed by decreasing a light receiving gain in a time interval where the light receiving unit receives the reflection light, and then the light receiving gain is increased after the time interval.

Since the length of the light path from the light emitting unit to the window is known when the light receiving gain is increased in the time interval where the light receiving unit receives the reflection light generated by the reflection of the window, the laser radar device can correct the formula used to calculate the distance from the laser radar device to the subject based on the sensing time of the reflection light.

However, when the laser radar device senses the reflection light generated by the reflection of the window, it is difficult to senses the external subject in the emitting direction of the laser light from which the reflection light is generated. When the sensing time of the reflection light generated by the reflection of the window is used to correct the formula that calculates the distance from the laser radar device to the subject, it is possible that a subject sensing performance is deteriorated.

It is an object of the present disclosure to provide a laser radar device in which all of scanning directions of laser lights face windows, a deterioration of a sensing performance of a subject is suppressed, and an equation calculating a distance from the laser radar device to the subject is corrected.

According to a first aspect of the present disclosure, the laser radar device includes a light emitting unit, a scanning unit, a window, a light receiving unit, a distance calculating unit, a storage unit, a sensing level setting unit, a time measuring unit and a correcting unit.

The light emitting unit emits laser lights having a pulse waveform.

The scanning unit scans the laser lights emitted by the light emitting unit.

When the laser lights scanned by the scanning unit are emitted to an exterior of the laser radar device, the laser lights pass the window. All of scanning directions of the laser lights scanned by the scanning unit are in directions toward the window.

The light receiving unit receives reflection lights that are the laser lights reflected by an external subject.

The distance calculating unit calculates a distance from the laser radar device to the external subject, by using a distance calculation formula that calculates the distance based on a time interval from a time point that the laser lights are emitted by the emitting unit to a time point that the reflection lights that are the laser lights reflected by the external subject are received by the light receiving unit.

The storage unit stores an emitting direction of an inner reflection-measurement laser light, wherein three laser lights that are continuous in a scanning order include a first laser light, a second laser light and a third laser light, and the second laser light is used as the inner reflection-measurement laser light when a distance between a spot defined by the first laser light at a maximum sensing distance and a spot defined by the third laser light at the maximum sensing distance is less than or equal to a size of the external subject that is previously set, and the maximum sensing distance is predetermined.

The sensing level setting unit sets a sensing level of the reflection lights to a level where an inner reflection light can be sensed when emitting directions of the laser lights scanned by the scanning unit are in the emitting direction of the inner reflection-measurement laser light stored in the storage unit. The sensing level setting unit sets the sensing level to a level where the light receiving unit is not saturated with the inner reflection light when the emitting directions of the laser lights scanned by the scanning unit are not in the emitting direction of the inner reflection-measurement laser light.

The time measuring unit measures an inner light-reflection sensing time that is a time interval from a time point that the light emitting unit emits the inner reflection-measurement laser light to a time point that the light receiving unit receives the reflection light that is the inner reflection-measurement laser light reflected by the window.

The correcting unit corrects the distance calculation formula, based on the inner light-reflection sensing time measured by the time measuring unit.

According to the present disclosure, the storage unit stores an emitting direction of the inner reflection-measurement laser light. When the emitting directions of the laser lights scanned by the scanning unit are in the emitting direction of the inner reflection-measurement laser light, the sensing level setting unit sets the sensing level where the inner reflection-measurement laser light can be sensed. Thus, the time measuring unit can measure the inner light-reflection sensing time, and the correcting unit can correct the distance calculation formula based on the inner light-reflection sensing time.

When the emitting directions of the laser lights are not in the emitting direction of the inner reflection-measurement laser light, the sensing level setting unit sets the sensing level of the reflection lights to a level where the light receiving unit is not saturated with the inner reflection light. Thus, when the emitting directions of the laser lights are not in the emitting direction of the inner reflection-measurement laser light, the light receiving unit can receives the reflection lights from external without being saturated.

The inner reflection-measurement laser light is the second laser light among the three laser lights that are continuous in the scanning order and include the first laser light, the second laser light and the third laser light, and the distance between the spot defined by the first laser light at the maximum sensing distance and the spot defined by the third laser light at the maximum sensing distance is less than or equal to the size of the external subject.

Thus, when the external subject cannot be sensed by the second laser light, a length in a scanning direction of the second laser light where the external subject cannot be sensed in the emitting direction of the second laser light is less than or equal to the size of the external subject. Since the second laser light is used as the inner reflection-measurement laser light, a deterioration of the sensing performance of the external subject can be suppressed.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereafter, referring to drawings, an embodiment of the present disclosure will be described.

Figure 1:
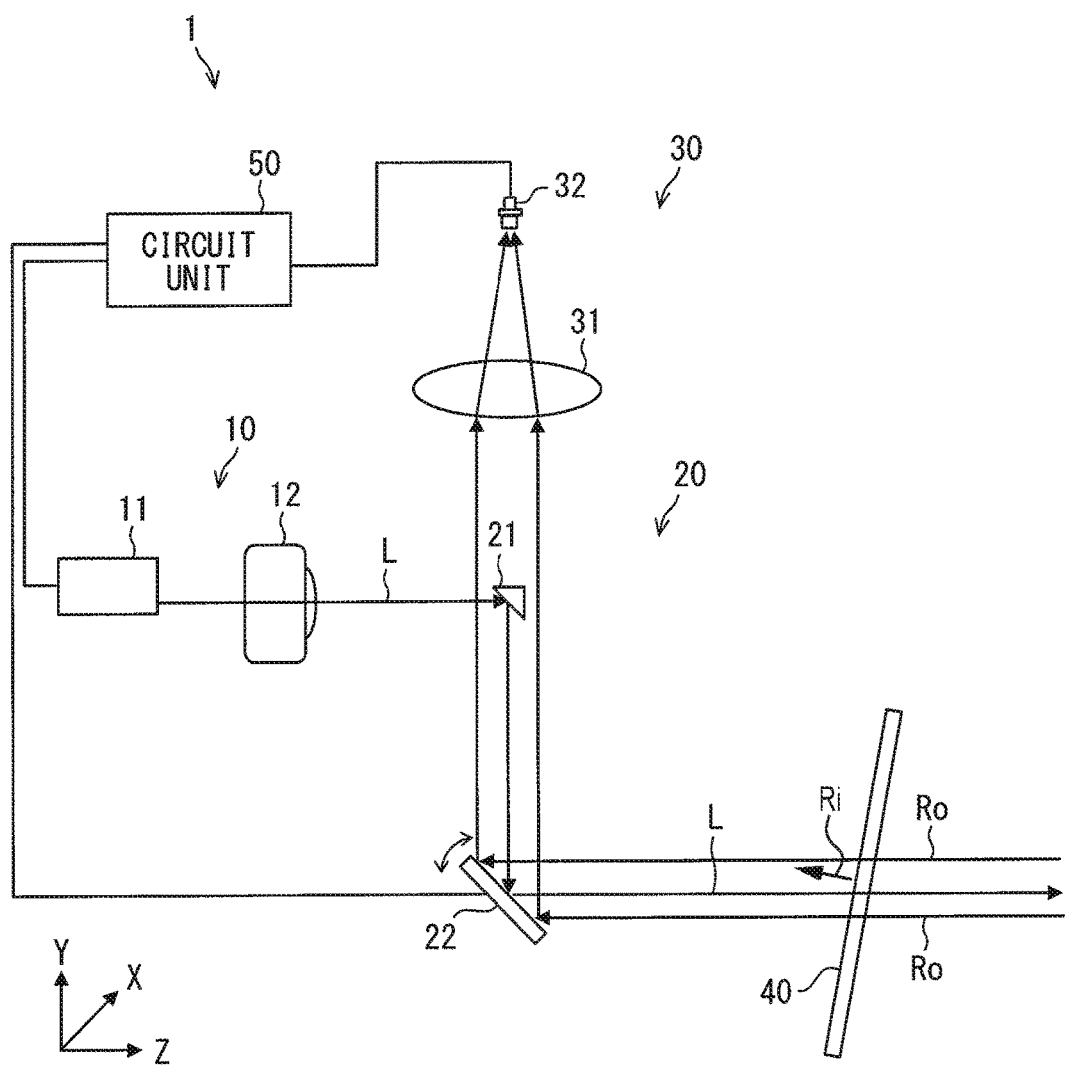
FIG. 1 is a diagram showing an inner constitution of a laser radar device according to an embodiment of the present disclosure.

As shown in FIG. 1, a laser radar device 1 includes a light emitting unit 10, a scanning unit 20, a light receiving unit 30, a window 40 and a circuit unit 50. The light emitting unit 10, the scanning unit 20, the light receiving unit 30 and the circuit unit 50 are housed in a housing that is not shown, and are directly or indirectly fixed to the housing. The window 40 is mounted to an opening of the housing.

The light emitting unit 10 includes a laser diode (LD) 11 that is a light source, and an emitting-light collimating unit 12. The laser diode 11 is a member that generates a laser light L having a pulse waveform. A light emitting diode can be used to replace the laser diode 11. A wave length of the laser L generated by the laser diode 11 is not limited. The laser light L may be a visible light or an infrared light.

Figure 4:
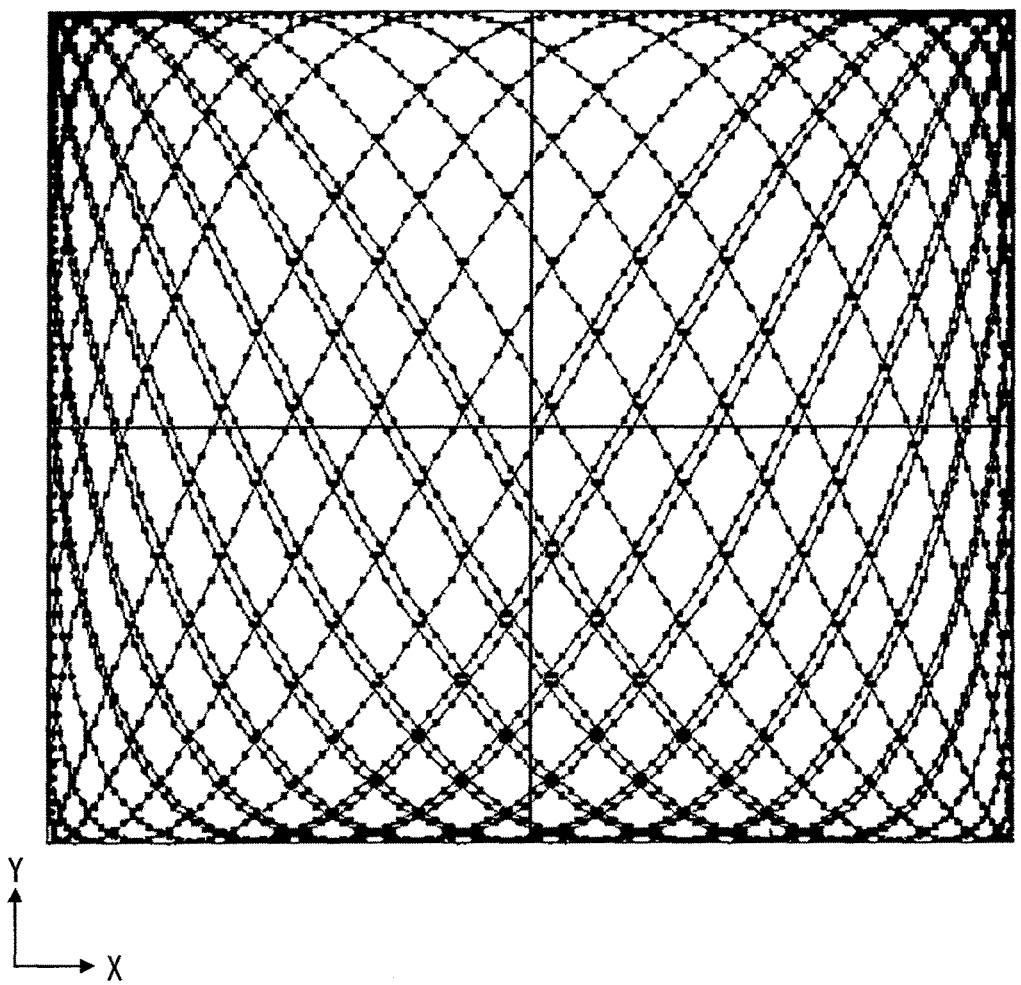
FIG. 4 is a diagram showing an emitting direction of a laser light that is scanned by a scanning mirror.

The emitting-light collimating unit 12 uses a collimate lens. As the above description, the light emitting unit 10 generates laser lights L that are substantially parallel to each other, and omits the laser lights L. A flux of the laser lights L the passes through the emitting-light collimating unit 12 is adjusted to slightly diffuse. Thus, when sizes of spots of the laser lights L at a maximum sensing distance becomes greater, a gap between the spot of one laser light L and the spot of the laser light L that is emitted right after the one laser light L can become narrower at the maximum sensing distance. As shown in FIG. 4, according to the present embodiment, an angle pitch of an emitting direction of the laser light L is not constant. As shown in FIG. 4, according to the present embodiment, an angle pitch of the laser light L in an emitting direction is not constant. Thus, a size of the gap varies according to a variation of the emitting direction of the laser light L. The gap is established based on the angle pitch of the emitting direction of the laser light L and the size of the spot of the laser light L at the maximum sensing distance. When the angle pitch of the emitting direction of the laser light L becomes maximum, the size of the gap becomes maximum. In this case, the size of the spot of the laser light L at the maximum sensing distance is adjusted such that the size of the gap becomes less than or equal to a size of a subject that is a component to be sensed.

According to the present embodiment, the subject may be a human body. In this case, considering a length of the human body in a direction from a chest to a back, the size of the subject may be 20 cm. The maximum sensing distance is a maximum distance on a catalog that is determined to be a distance where the laser radar device 1 can sense the subject. According to the present embodiment, the maximum sensing distance is 30 m. According to the present disclosure, the maximum sensing distance is set to be wider than a device specification. For example, the maximum sensing distance may be set to 15 m or 100 m.

The scanning unit 20 includes a deflection mirror 21 and a scanning mirror 22. The deflection mirror 21 is a mirror that is fixed, and includes a mirror surface where the laser light L emitted by the light emitting unit 10 enters. The deflection mirror 21 reflects the laser light L that entered toward the scanning mirror 22. The scanning mirror 22 where the laser light L reflected by the deflection mirror 21 entered deflects the laser light L in direction of the window 40. The scanning mirror 22 three-dimensionally scans deflection directions. Thus, the laser light L where the emitting direction is three-dimensionally scanned passes through the window 40, and is emitted to an exterior of the laser radar device 1.

According to the present embodiment, the scanning mirror 22 includes a mirror surface that is a flat surface. The scanning mirror 22 is a MEMS mirror that can be driven by two axes, and is a mirror that scans the laser light L by fluctuating. In other words, the scanning mirror 22 is a fluctuating mirror. According to the present embodiment, a driving of the scanning mirror 22 is of an electromagnetic driving type. According to the electromagnetic driving type, a permanent magnet and a coil are arranged around a mirror, an angle of the mirror can be changed by changing a current flowing through the coil. The circuit unit 50 executes a scanning control of the scanning mirror 22.

An outer reflection light Ro that is the laser light L reflected by an external subject enters the scanning mirror 22. According to the present embodiment, the outer reflection light Ro is a reflection light. When the outer reflection light Ro enters the scanning mirror 22, the outer reflection light Ro is reflected in a direction of the deflection mirror 21 that is a direction in which the laser light L entered the scanning mirror 22.

The light receiving unit 30 is placed at a position in a travelling direction of the outer reflection light Ro that is reflected by the scanning mirror 22. In this case, a distance from the scanning mirror 22 to the light receiving unit 30 is greater than a distance from the scanning mirror 22 to the deflection mirror 21. The light receiving unit 30 includes a light receiving lens 31 and a photodiode (PD) 32 that is a light receiver.

The light receiving lens 31 collects the outer reflection light Ro reflected by the scanning mirror 22 at the photodiode 32. According to the present embodiment, the photodiode 32 is an avalanche photodiode, and outputs a signal indicating a light quantity of the outer reflection light Ro entering the photodiode 32.

As shown in FIG. 1, a Z-axis is a scanning center of an elevation-depression angle direction of the laser light L being three-dimensionally scanned by using the scanning mirror 22. The Z-axis includes a front direction of the laser radar device 1. The front direction of the laser radar device 1 is parallel to a bottom surface of the laser radar device 1, and is a direction that is a center of a scanning range of the laser light L in a width direction of the scanning range. Alternatively, the front direction of the laser radar device 1 is perpendicular to a vertical direction axis of the laser radar device 1, and is the direction that is the center of the scanning range of the laser light L in the width direction of the scanning range. A Y-axis is an axis in a vertical direction crossing the Z-axis at right angles. An X-axis is an axis crossing the Z-axis and the Y-axis at right angles.

The window 40 is a member having an optical transparency, and has an area greater than the scanning range of the laser light L. Thus, all of the emitting directions of the laser lights L scanned by using the scanning mirror 22 are in directions toward the window 40. In other words, all of the emitting directions of the laser lights L scanned by using the scanning mirror 22 face the window 40. However, a part of the laser light L in each of the emitting directions is reflected by the window 40 and travels toward an interior of the laser radar device 1. The laser light L reflected by the window 40 is referred to as an inner reflection light Ri. According to the present embodiment, the inner reflection light Ri is the reflection light.

A setting angle of the window is set to an angle where the laser light L does not enter in a direction perpendicular to a surface of the window 40 without respect to an angle of the scanning mirror 22 in a case where the scanning mirror 22 fluctuates. When the laser light L from the scanning mirror 22 enters the window 40 in the direction perpendicular to the surface of the window 40, the inner reflection light Ri of the inner reflection lights Ri having a strength in the Gauss distribution which has a maximum strength may enter the scanning mirror 22. Specifically, according to the present embodiment, the window 40 is arranged at an angle where a distance from a top edge of the window 40 to the scanning mirror 22 in a direction parallel to the Z-axis is greater than a distance from a bottom edge of the window 40 to the scanning mirror 22 in a direction parallel to the Z-axis.

However, since the inner reflection light Ri has the strength in the Gauss distribution, a part of the inner reflection light Ri enters the photodiode 32 through the light receiving lens 31 after being reflected by the scanning mirror 22. When a distance from the photodiode 32 to the external subject, a light receiving gain of the photodiode 32 is set to a low value until the inner reflection light Ri enters the photodiode 32.

Figure 2:
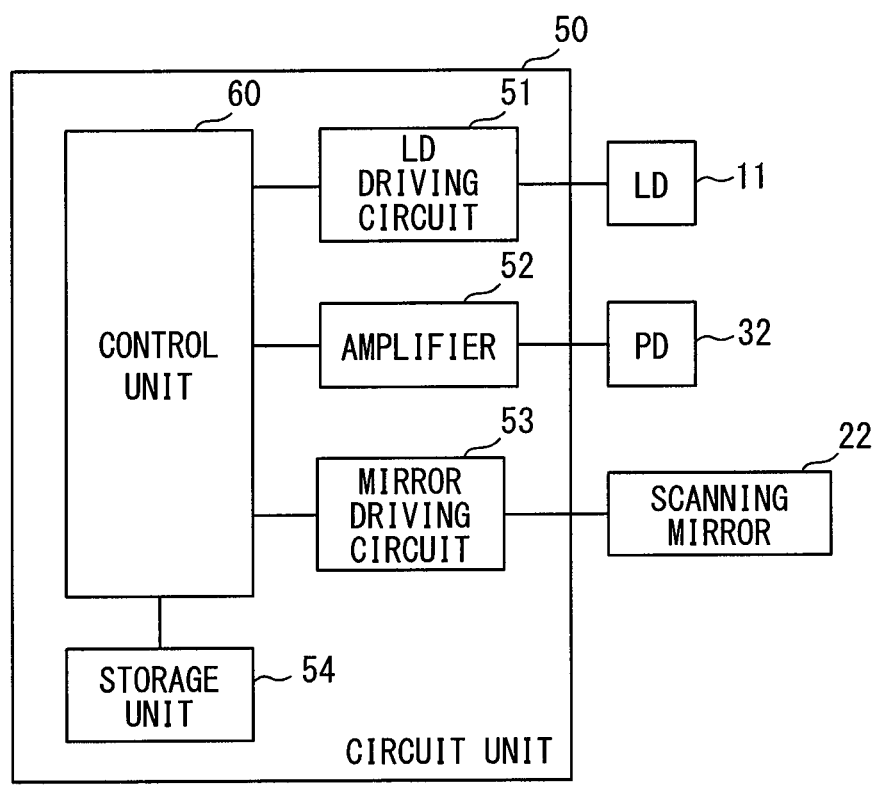
FIG. 2 is a diagram showing a constitution of a circuit unit in FIG. 1.

As shown in FIG. 2, the circuit unit 50 includes a LD driving circuit 51, an amplifier 52, a mirror driving circuit 53, a storage unit 54 and a control unit 60. The LD driving circuit 51 is a circuit driving the laser diode 11. The amplifier 52 amplifies an electrical signal outputted by the photodiode 32 and then outputs the electrical signal to the control unit 60. The mirror driving circuit 53 is a circuit controlling the scanning mirror 22 to fluctuate by controlling a current to flow through a coil included in the scanning mirror 22. The storage unit 54 is rewritable, and stores the emitting direction of an inner reflection-measurement laser light.

The inner reflection-measurement laser light is the laser light L used for measuring the inner reflection light Ri. When the emitting direction of the laser light L is in the emitting direction of the inner reflection-measurement laser light, the control unit 60 controls the light receiving gain to sense the inner reflection light Ri.

The control unit 60 includes circuits such as a CPU, a ROM, a RAM, an ASIC, a CPLD and a converter. The control unit 60 executes various functions by using at least a part of the above circuits. For example, the CPU executes a program stored in the ROM while uses a temporary storing function of the RAM.

Figure 3:
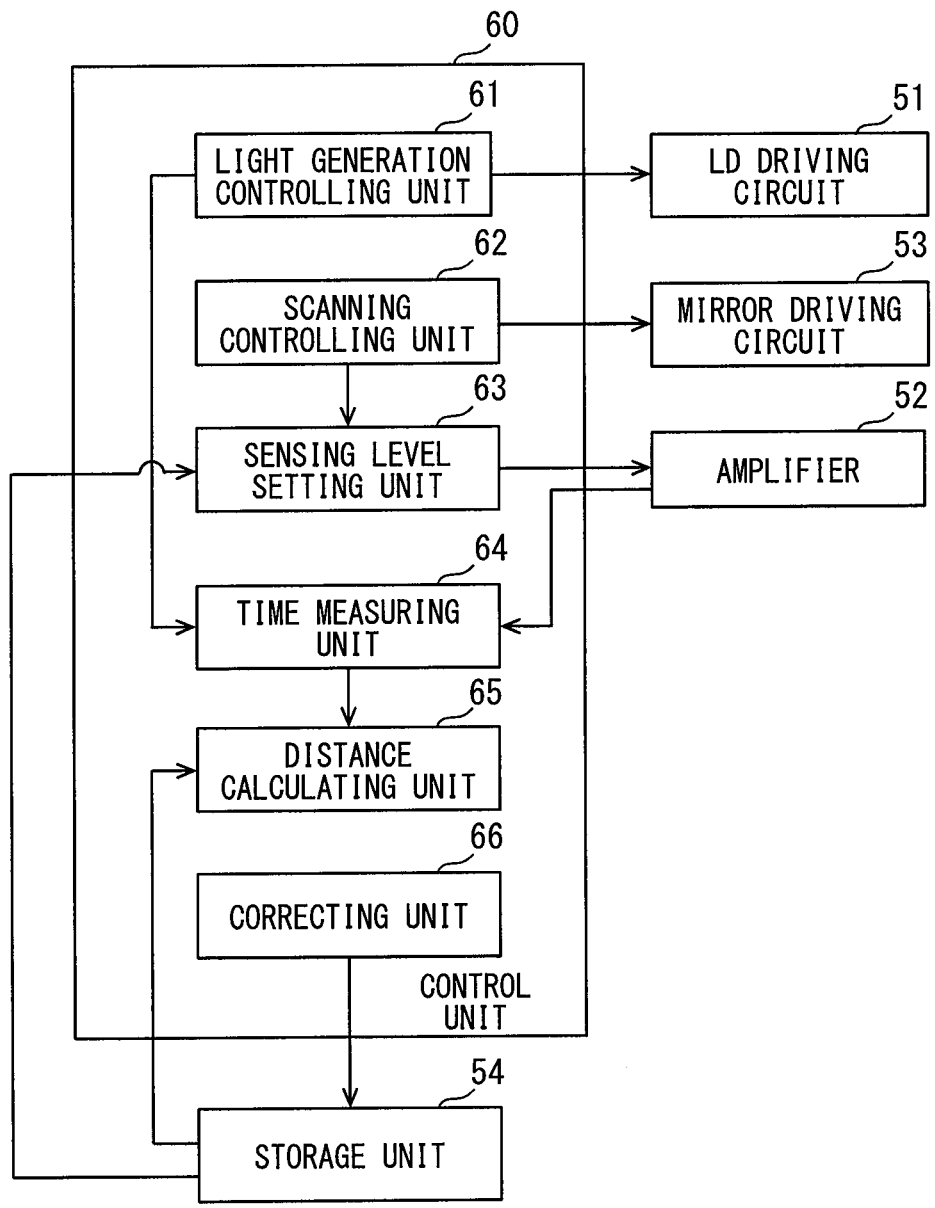
FIG. 3 is a diagram showing a constitution of a control unit in FIG. 1.

As shown in FIG. 3, the control unit 60 includes a light generation controlling unit 61, a scanning controlling unit 62, a sensing level setting unit 63, a time measuring unit 64, a distance calculating unit 65 and a correcting unit 66.

The light generation controlling unit 61 outputs a light generation command to the LD driving circuit 51, and controls the laser diode 11 to generate the laser light L having a pulse waveform. The light generation command includes an information indicating a driving voltage value. The LD driving circuit 51 uses the driving voltage value set by the light generation command to drive the laser diode 11 to generate the laser light L. The laser light L having a pulse waveform is generated by the laser diode 11 by setting a change of the driving voltage value to a pulse waveform. The light generation controlling unit 61 controls to generate the laser light L having a pulse waveform at a specified period.

Since the scanning controlling unit 62 changes a voltage applied to the mirror driving circuit 53 at a predetermined frequency, the scanning controlling unit 62 changes the scanning mirror 22 in a scanning angle range that is predetermined in a direction parallel to the X-axis and in a direction parallel to the Y-axis. Thus, the laser light L is scanned in the scanning angle range in the direction parallel to the X-axis and in the direction parallel to the Y-axis.

FIG. 4 is a diagram showing the emitting direction of the laser light L according to the present embodiment. Spots shown in FIG. 4 indicate the emitting directions. According to the present embodiment, as shown in FIG. 4, the emitting direction of the laser light L is scanned along a Lissajous curve line in the scanning angle range. The scanning controlling unit 62 controls the scanning mirror 22 to fluctuate along a Lissajous curve line.

According to the present embodiment, as shown in FIG. 4, the emitting directions of the laser lights L become relatively sparse in a center region of the scanning angle range, and become relatively dense at an edge region of the scanning angle range. Particularly, the emitting directions of the laser lights L become densest at a corner region of the scanning angle range. Since the laser light L is emitted at the specified period, a fluctuating rate of the scanning mirror 22 becomes lower at the edge region of the scanning angle range when the scanning mirror 22 fluctuates such that the emitting direction of the laser light L is scanned along a Lissajous curve line.

The spot of the laser light L is a substantially circular shape having a center that is each of the spots shown in FIG. 4. A size of a circle of the spot is adjusted such that the emitting direction of the laser light L is parallel to the emitting-light collimating unit 12.

When the emitting direction of the laser light L is in the emitting direction of the inner reflection-measurement laser light stored in the storage unit 54, the sensing level setting unit 63 sets a sensing level of the inner reflection light Ri to a value where the inner reflection light Ri can be sensed. When the emitting direction of the laser light L is not the emitting direction of the inner reflection-measurement laser light, the sensing level setting unit 63 sets the sensing level to a value where the photodiode 32 is not saturated with the inner reflection light Ri. When the photodiode 32 is saturated, an output current of the photodiode 32 is constant. A setting of the sensing level is executed by controlling the light receiving gain of the amplifier 52.

Figure 5:
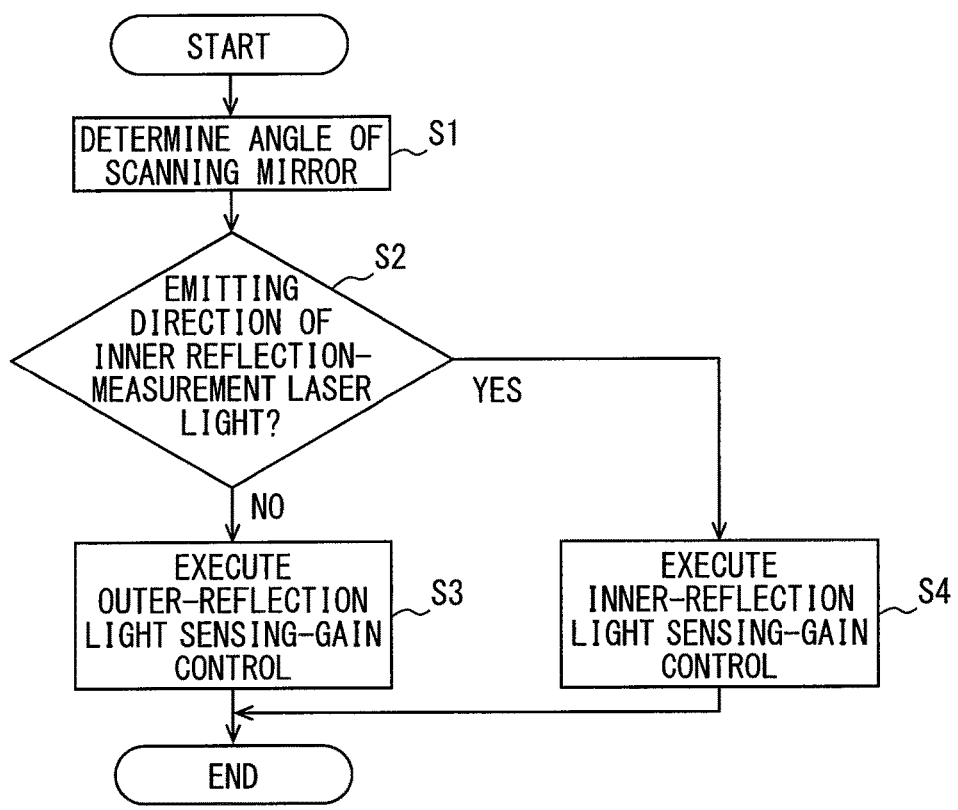
FIG. 5 is a flowchart showing an operation executed by a sensing level setting unit of FIG. 3.

FIG. 5 is a flowchart showing an operation executed by the sensing level setting unit 63. The sensing level setting unit 63 periodically executes the operation shown in FIG. 5 in a time interval where a scanning of the laser light L is executed. At S1, the sensing level setting unit 63 determines the angle of the scanning mirror 22. According to the present embodiment, the angle of the scanning mirror 22 is sensed at a time point that an elapsed time from a time point that is a reference point has passed. Since the voltage applied to the mirror driving circuit 53 is changed at the predetermined frequency, the scanning mirror 22 is controlled to fluctuate. Thus, the angle of the scanning mirror 22 can be determined from the time point that the elapsed time from the reference point has passed. At the reference point of the scanning mirror 22, the angle of the scanning mirror 22 is sensed based on a magnetic field around the scanning mirror 22. The magnetic field around the scanning mirror 22 changes according to the angle of the scanning mirror 22. The magnetic field around the scanning mirror 22 is sensed by using a magnetic sensor.

At S2, the sensing level setting unit 63 determines whether the emitting direction of the laser light L determined based on the angle of the scanning mirror 22 determined at S1 is in the emitting direction of the inner reflection-measurement laser light stored in the storage unit 54. In this case, the laser light L determined based on the angle of the scanning mirror 22 determined at S1 is a next laser light L.

Figure 6:
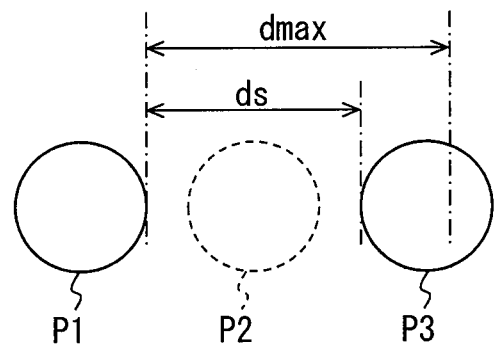
FIG. 6 is a diagram showing intervals between three spots obtained by three laser lights.
Figure 7:
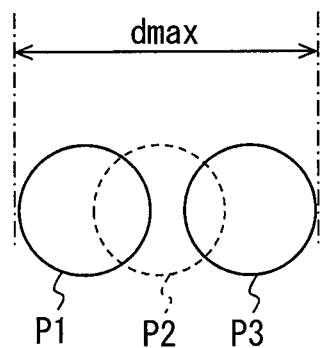
FIG. 7 is a diagram showing intervals between the spots which are narrower than the intervals in FIG. 6.
Figure 8:
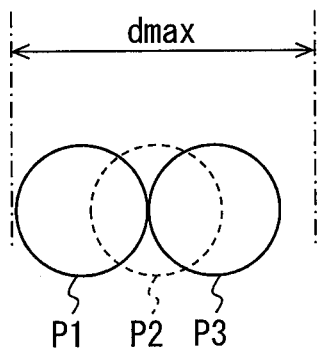
FIG. 8 is a diagram showing intervals between the spots which are narrower than the intervals in FIG. 7.

As shown in FIGS. 6 to 8, spots P1, P2, and P3 are defined at maximum sensing distances of three laser lights L which are continuous in a scanning order. Intervals between the spots P1, P2, and P3 are different as shown in FIGS. 6 to 8. The spots P2 shown in FIGS. 6 to 8 indicate the inner reflection-measurement laser light.

As shown in FIG. 4, the intervals of three laser lights L which are continuous in the scanning order changes according to the scanning of the laser lights. As shown in FIG. 6, the spots P1, P2, and P3 of the three laser lights L are not in contact with each other. In this case, a distance ds between the spot P1 and the spot P3 is shorter than a maximum allowable distance dmax. The maximum allowable distance dmax is a maximum distance that is allowable as a distance between the spots, and is equivalent to the size of the subject.

When the distance ds between the spot P1 and the spot P3 is shorter than the maximum allowable distance dmax, the subject is not received in a gap between the spot P1 and the spot P3. Thus, the subject can be sensed when the outer reflection light Ro cannot be sensed due to the laser light L indicated by the spot P2. Thus, when the spot P2 indicates the inner reflection-measurement laser light as shown in FIG. 6, a deterioration of a sensing performance of the laser radar device 1 can be suppressed.

As shown in FIG. 6, the maximum allowable distance dmax is greater than a diameter of the spot P2. Thus, the size of the spot P2 is smaller than or equal to the size of the subject. Similarly, as shown in FIGS. 7 and 8, the sizes of the spots P2 are smaller than or equal to the size of the subject.

As shown in FIG. 7, the spot P1 and spot P3 are not in contact with each other. However, the spot P2 partially overlaps the spots P1 and P3. In this case, when the spot P2 indicates the inner reflection-measurement laser light, the deterioration of the sensing performance of the laser radar device 1 can be further suppressed than that of when the spot P2 indicates the inner reflection-measurement laser light as shown in FIG. 6.

As shown in FIG. 8, the spot P1 and the spot P3 overlap each other at one point, that is, the spot P1 and the spot P3 are in contact with each other. In this case, when the spot P2 indicates the inner reflection-measurement laser light, the sensing performance of the laser radar device 1 are not deteriorated on the Lissajous curve lines shown in FIG. 4 that are directions where centers of the spots pass.

An emitting angle range where the spot P1 and the spot P3 are further closer than that shown in FIG. 8 exists. In this case, the spot P1 and the spot P3 overlap each other by an area that is greater than the point shown in FIG. 8, at an angle of the emitting angle range shown in FIG. 4.

The spot of the inner reflection-measurement laser light is the spot P2 meeting a condition that the distance ds between the spot P1 and the spot P3 is shorter than the maximum allowable distance dmax. The emitting direction of the inner reflection-measurement laser light is stored in the storage unit 54. As shown in FIGS. 6 to 8, all of the spots P2 meet the above condition. It is preferable that the spot P2 where the distance ds between the spot P1 and the spot P3 is as small as possible is selected to set the inner reflection-measurement laser light. According to the present embodiment, as shown in FIG. 4, the inner reflection-measurement laser light is set in the corner region or the edge region of the scanning angle range after the laser light L is scanned.

In the above case where the above conditions are met, the inner reflection-measurement laser light may be selected among the laser lights L, and a total number of the inner reflection-measurement laser lights may be set.

When the sensing level setting unit 63 determines that the emitting direction of the next laser light L is not the emitting direction of the inner reflection-measurement laser light at S2 (S2: No), the sensing level setting unit 63 proceeds to S3. At S3, the sensing level setting unit 63 executes an outer-reflection light sensing-gain control. When the sensing level setting unit 63 determines that the emitting direction of the next laser light L is in the emitting direction of the inner reflection-measurement laser light at S2 (S2: Yes), the sensing level setting unit 63 proceeds to S4. At S4, the sensing level setting unit 63 executes an inner-reflection light sensing-gain control. The outer-reflection light sensing-gain control and the inner-reflection light sensing-gain control change the light receiving gain with time after the laser light L emits.

Figure 9:
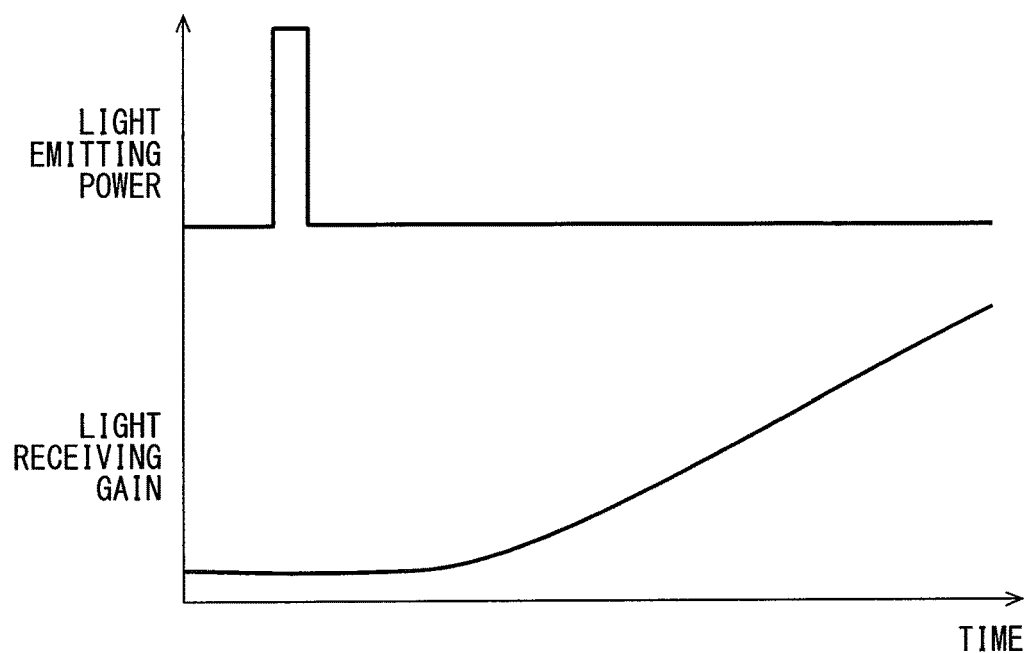
FIG. 9 is a graph showing an outer-reflection light sensing-gain control executed in FIG. 5.

FIG. 9 is a graph showing the outer-reflection light sensing-gain control. In the outer-reflection light sensing-gain control, the light receiving gain is maintained to a low value for a predetermined time after the laser light L having a pulse waveform is emitted by changing a light emitting power of the pulse waveform by using the light generation controlling unit 61. In this case, the predetermined time is set to be a time interval where a time point that the inner reflection light Ri is received by the photodiode 32 has passed. Then, the photodiode 32 is not saturated with the inner reflection light Ri. After the predetermined time has passed, the light receiving gain is gradually increased, and the outer reflection light Ro decreasing relative to a distance can be sensed.

Figure 10:
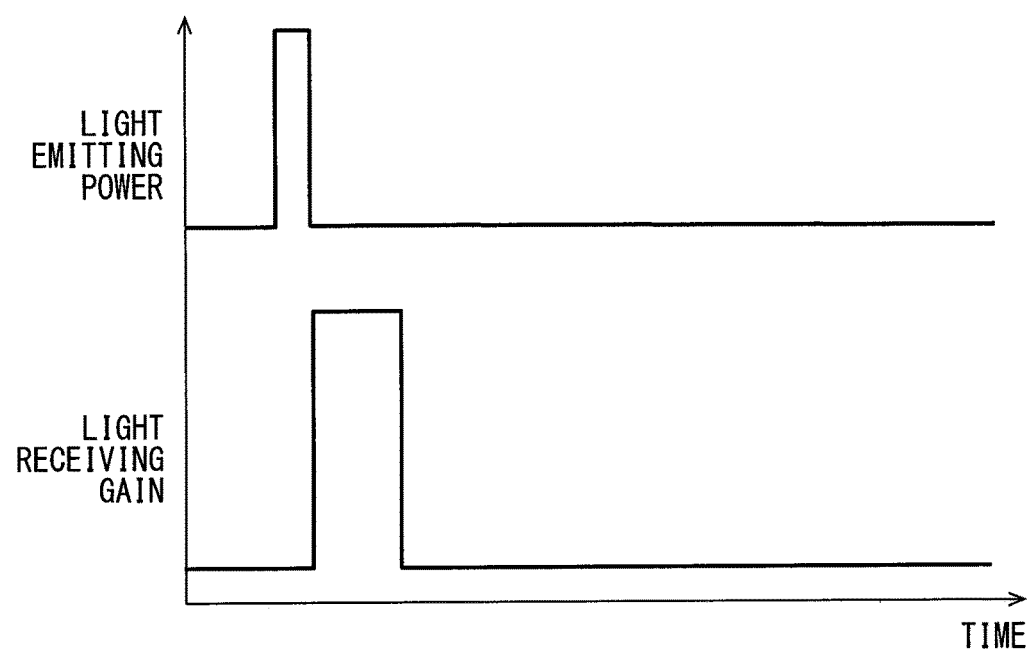
FIG. 10 is a graph showing an inner-reflection light sensing-gain control executed in FIG. 5.

At S4, in the inner-reflection light sensing-gain control, the sensing level setting unit 63 changes the light receiving gain with time, as shown in FIG. 10. Specifically, the sensing level setting unit 63 increases the light receiving gain right after the light generation controlling unit 61 changes the light emitting power, and maintains the light receiving gain at a high value until the time point that the inner reflection light Ri is received by the photodiode 32 has passed.

As shown in FIG. 10, the light receiving gain rises vertically. According to the present disclosure, the light receiving gain is not limited to rise vertically. the light receiving gain may be increased to a value that the inner reflection light Ri can be sensed. It is preferable that a rising rate of the light receiving gain become rapid. When a rising rate of a sensing waveform of the inner reflection light Ri becomes rapid, a sensing time of the inner reflection light Ri can be accurately determined.

When it is certain that a time point that the inner reflection light Ri is sensed by the photodiode 32 has passed, a time point that a time interval where the light receiving gain is maintained at the high value is completed may be any time point. A magnitude of the light receiving gain used to sense the inner reflection light Ri is equal to a maximum value of the light receiving gain in the outer-reflection light measurement control. According to the present disclosure, when the inner reflection light Ri can be sensed, the magnitude of the light receiving gain used to sense the inner reflection light Ri may be a value less than the maximum value of the light receiving gain in the outer-reflection light measurement control.

The time measuring unit 64 measures a light-reflection sensing time that is a time interval from a time point that the laser diode 11 emits the laser light L to a time point that the photodiode 32 senses the reflection light. A time point that the light generation controlling unit 61 outputs the light generation command to the LD driving circuit 51 is used as the time point that the laser diode 11 emits the laser light L. A time point that the electrical signal outputted by the photodiode 32 is obtained through the amplifier 52 and the electrical signal exceeds a light-reflection sensing threshold that is predetermined is used as the time point that the photodiode 32 senses the reflection light. The reflection light may be the inner reflection light Ri or the outer reflection light Ro. When the reflection light is the inner reflection light Ri, the light-reflection sensing time is used as an inner light-reflection sensing time. When the reflection light is the outer reflection light Ro, the light-reflection sensing time is used as an outer light-reflection sensing time.

The distance calculating unit 65 calculates a distance to the subject, based on the inner light-reflection sensing time, a distance calculation formula previously stored in the storage unit 54. The distance calculation formula is a formula where a light propagation distance is calculated by multiplying a light speed by the light-reflection sensing time and the light propagation distance is multiplied by a correction coefficient. The correction coefficient is used to correct a time delay generated in a calculation operation. According to the present disclosure, a value obtained by subtracting a length of a light path in the laser radar device 1 from the light propagation distance may be multiplied by the correction coefficient.

The correcting unit 66 corrects the correction coefficient of the distance calculation formula stored in the storage unit 54. The correcting unit 66 uses the inner light-reflection sensing time measured by the time measuring unit 64. Since the inner reflection light Ri is the laser light L reflected by the window 40, the length of the light path is known. Thus, a change of the inner light-reflection sensing time measured by the time measuring unit 64 corresponds to a change of the delay time of the calculation operation. Then, the correction coefficient can be corrected based on the inner light-reflection sensing time measured by the time measuring unit 64.

According to the present embodiment, the emitting direction of the inner reflection-measurement laser light is stored in the storage unit 54. When the emitting direction of the laser light L is in the emitting direction of the inner reflection-measurement laser light, the sensing level is set to a value where the inner reflection light Ri can be sensed, and the inner reflection light Ri that is the laser light L reflected by the window 40 is sensed. Thus, the inner light-reflection sensing time can be measured, and the correcting unit 66 can correct the distance calculation formula based on the inner light-reflection sensing time.

The inner reflection-measurement laser light is the second laser light L among the three laser lights L which are continuous in the scanning order. Thus, the outer reflection light Ro is not sensed from the second laser light L. A distance between the spot P1 of the first laser light L which indicates the maximum sensing distance and the spot P3 of the third laser light L which indicates the maximum sensing distance is less than or equal to the size of the subject.

Thus, when a sensing of the external subject is not executed by the second laser light L, a length of a scanning direction where the sensing of the external subject is difficult in the emitting direction of the second laser light L is less than or equal to the size of the subject. Thus, the deterioration of the sensing performance can be suppressed by using the second laser light L as the inner reflection-measurement laser light.

According to the present disclosure, in the laser radar device, the inner reflection-measurement laser light is the second laser light of when a spot defined by the second laser light at the maximum sensing distance overlaps at least a part of the spot defined by the first laser light at the maximum sensing distance and the spot defined by the third laser light at the maximum sensing distance, among the three laser lights that are continuous in the scanning order.

Comparing with a case where the spots defined by the three laser lights at the maximum sensing distance do not overlap each other, the deterioration of the sensing performance of the external subject generated due to the second light by which the external subject cannot be sensed can be suppressed.

According to the present disclosure, in the laser radar device, the inner reflection-measurement laser light is the second laser light of when the spot defined by the first laser light at the maximum sensing distance overlaps at least a part of the spot defined by the third laser light at the maximum sensing distance, among the three laser lights that are continuous in the scanning order.

Since the sensing performance of the external subject of when the second laser light is not used to sense the external subject is equal to or at the same level relative to that of when the second laser light is used to sense the external subject in the scanning direction of the second laser light, the deterioration of the sensing performance of the external subject can be suppressed.

According to the present disclosure, in the laser radar device, the light emitting unit emits the laser light at a specified period, and the scanning unit includes a fluctuating mirror and scans the laser light by using the fluctuating mirror.

Since the scanning unit uses the fluctuating mirror to scan the laser light, the scanning direction of the laser light remarkably changes at an edge region of a scanning angle range of the laser light. When the scanning direction becomes completely opposite, a speed of the fluctuating mirror temporarily becomes zero. Thus, the speed of the fluctuating mirror is decreased where the scanning direction changes. According to the present disclosure, the light emitting unit emits the laser light at the specified period. Thus, since an angle pitch of the emitting direction of the laser light becomes smaller at the edge region of the scanning angle range, the emitting direction of the inner reflection-measurement laser light can be set at the edge region of the scanning angle range.

When the laser radar device monitors a subject, it is common that a region in the vicinity of the scanning angle range is set to a most-necessary monitoring region, and the edge region of the scanning angle range is relatively unnecessary to be monitored. Thus, since the emitting direction of the inner reflection-measurement laser light is set at the edge region of the scanning angle range, the deterioration of the sensing performance of the external subject can be further suppressed.

The present disclosure is not limited to the embodiments mentioned above, and can be applied to various embodiments within the spirit and scope of the present disclosure. In the following description, a part that corresponds to a matter described in a preceding embodiment may be assigned with the same reference numeral, and redundant explanation for the part may be omitted. When only a part of a configuration in each embodiment is changed, the other parts of the configuration can be configured as the same as a prior embodiment.

According to the present embodiment, the emitting direction of the laser light L is scanned in the Lissajous curve line. However, the emitting direction of the laser light L may be scanned by using a raster scan to sequentially move in a straight line.

According to the present embodiment, the laser radar device 1 is a coaxial laser radar device where the light receiving unit 30 is arranged in a travelling direction of the reflection light reflected by the scanning mirror 22. However, the present disclosure may be applied to a non-coaxial laser radar device.

According to the present embodiment, the sensing level where the inner reflection light Ri can be sensed is switched by changing the light receiving gain. However, the sensing level may be switched by changing the light emitting power or by changing both the light receiving gain and the light emitting power.

According to the present embodiment, the laser light L is emitted at the specified period. However, an emitting frequency of the laser light L may be variable.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A laser radar device comprising:
   a light emitting unit emitting laser lights having a pulse waveform;
   a scanning unit scanning the laser lights emitted by the light emitting unit;
   a window through which the laser lights scanned by the scanning unit pass when the laser lights are emitted to an exterior of the laser radar device, wherein all of scanning directions of the laser lights scanned by the scanning unit are in directions toward the window;
   a light receiving unit receiving reflection lights that are the laser lights reflected by an external subject;
   a distance calculating unit calculating a distance from the laser radar device to the external subject, by using a distance calculation formula that calculates the distance based on a time interval from a time point that the laser lights are emitted by the emitting unit to a time point that the reflection lights that are the laser lights reflected by the external subject are received by the light receiving unit;

a storage unit storing an emitting direction of an inner reflection-measurement laser light, wherein three laser lights that are continuous in a scanning order include a first laser light, a second laser light and a third laser light, and the second laser light is used as the inner reflection-measurement laser light when a distance between a spot defined by the first laser light at a maximum sensing distance and a spot defined by the third laser light at the maximum sensing distance is less than or equal to a size of the external subject that is previously set, and the maximum sensing distance is predetermined;

a sensing level setting unit setting a sensing level of the reflection lights to a level where an inner reflection light can be sensed when emitting directions of the laser lights scanned by the scanning unit are in the emitting direction of the inner reflection-measurement laser light stored in the storage unit, the sensing level setting unit setting the sensing level to a level where the light receiving unit is not saturated with the inner reflection light when the emitting directions of the laser lights scanned by the scanning unit are not in the emitting direction of the inner reflection-measurement laser light;

a time measuring unit measuring an inner light-reflection sensing time that is a time interval from a time point that the light emitting unit emits the inner reflection-measurement laser light to a time point that the light receiving unit receives the reflection light that is the inner reflection-measurement laser light reflected by the window; and a correcting unit correcting the distance calculation formula, based on the inner light-reflection sensing time measured by the time measuring unit.

2. The laser radar device according to claim 1, wherein the inner reflection-measurement laser light is the second laser light of when a spot defined by the second laser light at the maximum sensing distance overlaps at least a part of the spot defined by the first laser light at the maximum sensing distance and the spot defined by the third laser light at the maximum sensing distance, among the three laser lights that are continuous in the scanning order.

3. The laser radar device according to claim 2, wherein the inner reflection-measurement laser light is the second laser light of when the spot defined by the first laser light at the maximum sensing distance overlaps at least a part of the spot defined by the third laser light at the maximum sensing distance, among the three laser lights that are continuous in the scanning order.

4. The laser radar device according to claim 1, wherein the light emitting unit emits the laser light at a specified period, and the scanning unit includes a fluctuating mirror and scans the laser light by using the fluctuating mirror.

\* \* \* \* \*